June 2, 1953   G. L. KITSON   2,640,463
STOCK FEEDER
Filed Jan. 18, 1950

INVENTOR
GERALD L. KITSON
BY
ATTORNEY

Patented June 2, 1953

2,640,463

UNITED STATES PATENT OFFICE 2,640,463

STOCK FEEDER

Gerald L. Kitson, Rockford, Mich., assignor of one-half to C. N. Cordis, Chicago, Ill., one-sixth to Charles H. Kitson, and one-sixth to Leon Kitson, both of Rockford, Mich.

Application January 18, 1950, Serial No. 139,187

3 Claims. (Cl. 119—52)

This invention is an improvement over the disclosure of the application of Gerald L. and Charles H. Kitson, Serial No. 768,554, filed on August 14, 1947 and now matured into Patent No. 2,589,706. In that application an automatic stock feeder is described and claimed in which a feed conduit comprising an open-topped horizontal trough is arranged in communication with a supply hopper. An endless flexible distributing member is caused to move lengthwise along the conduit in a single direction relative thereto in order to distribute the feed throughout the length of the trough to make the same readily available for the stock. The preferred form of that invention involved a substantially closed circuit of conduit in which the chain or distributing member was caused to move around substantially the same circuit. Since an endless distributing member was used, it follows that the feed conduit should preferably follow the distributing member without discontinuity unless some sort of a catch basin is provided to receive the feed not removed by the stock during the period of transit along the conduit. If a non-continuous conduit were used with the mechanism of the above noted application, some sort of guide means should be provided for conducting the chain so that at least a closed circuit of the distributing member itself is completed.

The present invention provides a somewhat different relationship between the distributing means and the feed conduit from that shown and described in the application above referred to. A conduit is also provided which comprises an open-topped horizontal trough in communication with the feed-supply hopper. Feed is distributed within the conduit by means of a plurality of adjacent and generally parallel sections of endless flexible distributing members, with the sections moving in opposite directions. The word "sections" as used in this sense has reference to the length of the distributing member occupying a particular section of trough. The preferred form of the present invention involves a single endless flexible distributing member lying within a single trough having a horizontal idler sprocket at one end and driving sprocket at the opposite end. In this arrangement the flexible distributing member provides a pair of distributing member sections lying side by side within the same trough and moving in opposite directions. A feed supply hopper similar to that disclosed in the above noted application may be used, and it may be placed in communication with the feed conduit at any convenient point. It is entirely practical to place the feed supply hopper at a position intermediate the ends of the device; or a relatively complicated linear layout of trough may be used involving angles or curved sections with the supply hopper at any position required by the shelter with which it is associated.

The oppositely-moving distributor member sections may also be provided with the same type of trough by use of two endless flexible distributing means, each having a section lying within a particular trough with the sections moving in opposite directions. The remaining sections of the distributing members may be conducted around the system either by a suitable guiding rack or by a second trough system. This secondary trough system may act merely as a conduit, or may also provide an open-topped trough section for access to the feed moving therein.

The several features of the present invention will be analyzed in detail by a discussion of the particular embodiments illustrated in the accompanying drawings. In these drawings, Fig. 1 is a plan view showing the general arrangement of a poultry feeder embodying the present invention.

Figure 1:
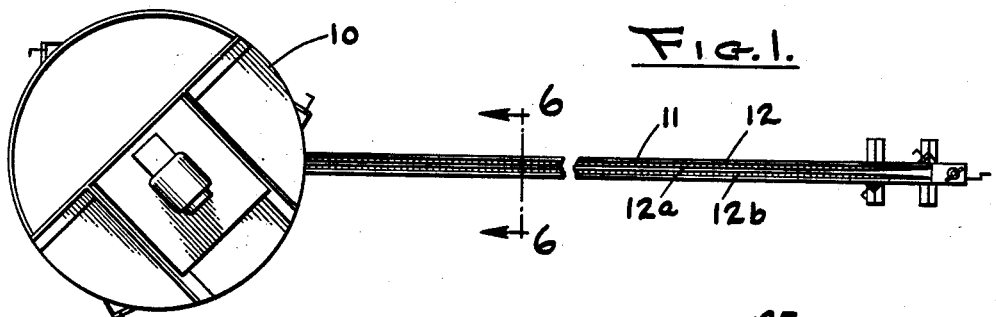

Referring to Figure 1, a poultry feeder is shown having the feed supply hopper 10 and the feed conduit comprising the open-topped trough 11. The endless flexible distributing member in the form of a flat link chain 12 is disposed within the trough with the chain sections 12a and 12b lying side by side.

Figure 3:
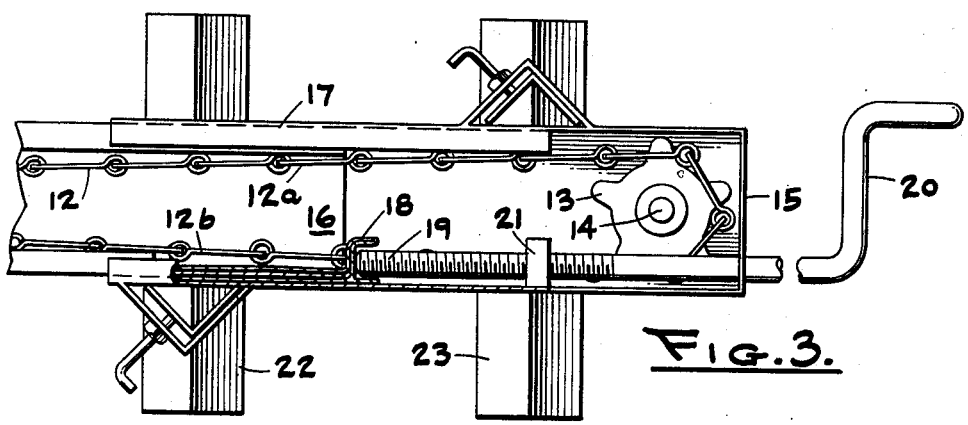
Fig. 3 shows an enlarged view of the mechanism in the neighborhood of the idler pulley of the device shown in Figure 1, including the chain-tightening system and leg support system.

Referring to Figure 3, it will be noted that the chain 12 (with the sections 12a and 12b) passes around the idler sprocket 13 mounted upon a suitable journal 14. The end of the trough is preferably obstructed by a dam 15. The end of the sheet metal trough section 16 is received within a suitable sleeve-like section 17 of the end member, and the axial movement of the trough section 16 with respect to the sleeve section is limited by the engagement of the abutment member 18 with the end of the stop 19. The abutment member is in the nature of a clip slipped over the end of the trough section 16 for the purpose of providing a larger and more durable surface for co-operation with the adjustable stop 19. The position of the stop 19 is controlled by the crank 20 and the engagement of suitable threads with a nut 21. Leg units provided with transverse feet as indicated at 22 and 23 are provided at intervals along the trough to maintain proper relationship with ground level.

Figure 2:
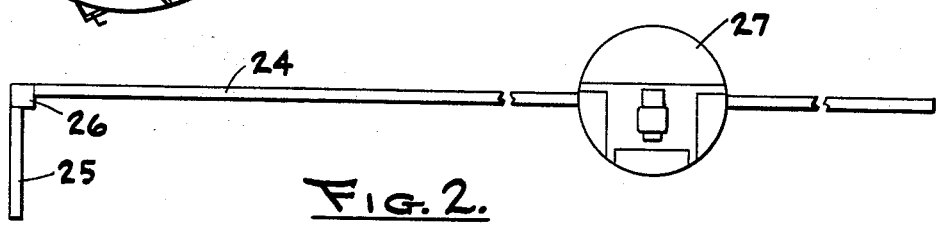
Fig. 2 shows a modified layout of the trough system and arrangement of the feed supply hopper using the same general mechanism as shown in Figure 1.

Referring to Figure 2, a device essentially similar in mechanical features to that indicated in Figure 1 is shown with a slightly different trough layout to indicate the flexibility provided by the present invention. The feed conduit in the view shown in Figure 2 comprises the trough sections 24 and 25. These trough sections are joined by suitable corner members 26 preferably containing a pair of sprockets mounted in substantially the same plane for the accommodation of the adjacent sections of endless flexible distributing means. The feed-supply hopper 27 is mounted at a point in the trough section 24 intermediate the ends thereof, and feed will be distributed in both directions to a substantially constant depth.

Figures 4, 5, 6:
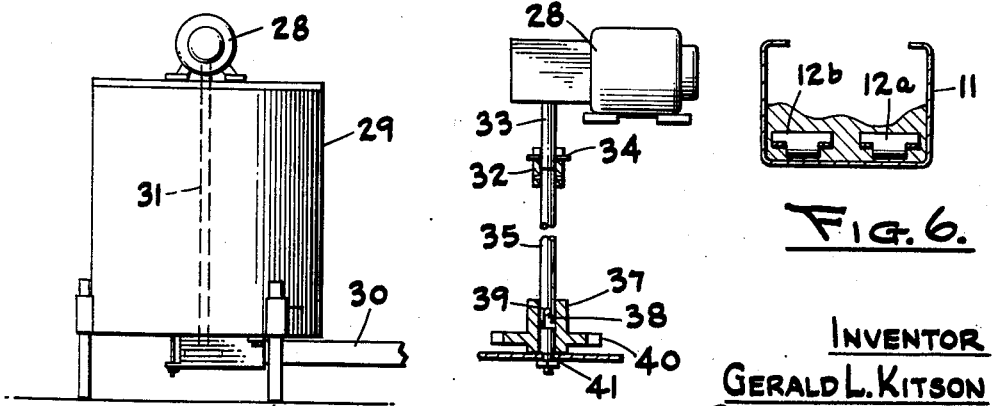
Fig. 4 is an elevation showing the exterior of the feed-supply hopper and the relationship between the drive mechanism and the feed conduit.
Fig. 5 is the illustration of the drive means for the transfer of power in the gear motor mounted on top of the feed supply hopper to the driving sprocket.
Fig. 6 is a section taken from the plane 6—6 of Figure 1 and showing the relationship between the distributing means and the feed trough.

Referring to Figures 4 and 5, the driving gearmotor 28 is shown mounted upon a suitable bracket on the top of the feed-supply hopper 29. The trough section 30 is shown secured to the under side of the hopper by suitable fastenings, and an outlet in the hopper is provided in communication with the trough section 30. The power transfer means generally indicated at 31 passes down through the axis of the hopper and drives a suitable agitating means. The ready disassembly of this portion of the mechanism is provided by a coupling 32 permitting the withdrawal of the stub shaft 33 carrying the crosspin 34. The motor bracket may be hinged if so desired on a generally horizontal axis to permit the disconnection of the power drive system, or the motor may be simply removed from a fixed base by the detachment of the conventional mounting fastenings. The torque supplied through the coupling 32 is transferred through the shaft 35 to the sprocket coupling 37 comprising the slotted end 38 of the shaft 35 and a suitable mating crosspin 39 intersecting the bore of the drive sprocket 40. A locating bearing 41 is provided in the lower portion of the conduit section adjacent the underbodying of the feed supply hopper as shown.

Referring to Figure 6, the relationship of the oppositely-moving feed distributors and the trough is shown. Depending upon the type of feed used in the machine, the movement thereof under the action of the distributing means shown will involve some combination of linear movement (following the direction of the distributing means to which the individual particle of feed is most closely associated) and a somewhat complicated turbulent cross-movement resulting from the intersection of the two streams of feed. With some types of feed, the movement appears to follow down one side of the trough, around the sprocket, and back on the other side before a substantially even level of feed is established.

The particular embodiments of the present invention which have been illustrated in the accompanying drawings and discussed herein are not to be considered as limitations upon the scope of the appended claims. In these claims it is the intent of the inventor to claim the entire invention to which he is entitled in view of the prior art.

I claim:

1. A stock feeder comprising a feed-supply hopper having a discharge outlet, conduit means communicating with said outlet, said conduit means comprising an open-top horizontal trough affording access by stock to feed contained therein, a plurality of adjacent sections of endless flexible distributing means traversing said conduit in opposite directions adjacent the bottom of said conduit, and drive means for imparting linear movement to said distributing means in said conduit.

2. A stock feeder comprising a feed-supply hopper having a discharge outlet, conduit means communicating with said outlet, said conduit means comprising an open-top horizontal trough affording access by stock to feed contained therein, a plurality of adjacent sections of endless flexible distributing means traversing said conduit in opposite directions adjacent the bottom of said conduit, said distributing means being substantially smaller in width and crosssection than the width and cross-section respectively of said trough, and drive means for imparting linear movement to said distributing means in said conduit.

3. A stock feeder comprising a feed-supply hopper having a discharge outlet, conduit means communicating with said outlet, said conduit means comprising an open-top horizontal trough affording access by stock to feed contained therein, sprocket means mounted in said conduit means, an endless flexible distributing member engaging said sprocket means and traversing said conduit in opposite directions adjacent the bottom of said conduit, said distributing member being substantially smaller in width and crosssection than the width and cross-section respectively of said trough, and drive means for imparting linear movement to said distributing means in said conduit.

GERALD L. KITSON.

References Cited in the file of this patent

UNITED STATES PATENTS

| Number | Name | Date |
|---|---|---|
| 2,302,314 | Haggart | Nov. 17, 1942 |

OTHER REFERENCES

"Automatic Poultry Feeder Plan," Progress Report No. 2, September 1948, published by Pennsylvania State College.